United States Patent
Lee et al.

(10) Patent No.: US 12,013,309 B2
(45) Date of Patent: Jun. 18, 2024

(54) ANDERON METER FOR CRYOGENIC ENVIRONMENT AND MEASURING METHOD FOR BEARING FRICTION TORQUE USING THE SAME

(71) Applicant: KOREA INSTITUTE OF SCIENCE AND TECHNOLOGY, Seoul (KR)

(72) Inventors: Yong Bok Lee, Seoul (KR); Wonil Kwak, Seoul (KR); Yunseok Ha, Seoul (KR); Yeong-do Lee, Seoul (KR); Jeon Kook Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 46 days.

(21) Appl. No.: 17/861,714

(22) Filed: Jul. 11, 2022

(65) Prior Publication Data

US 2023/0048331 A1 Feb. 16, 2023

(30) Foreign Application Priority Data

Jul. 30, 2021 (KR) .......................... 10-2021-0100735

(51) Int. Cl.
*G01M 13/045* (2019.01)
(52) U.S. Cl.
CPC ................ *G01M 13/045* (2013.01)
(58) Field of Classification Search
None
See application file for complete search history.

(56) References Cited

U.S. PATENT DOCUMENTS 6,286,374 B1 * 9/2001 Kudo .................. G01M 13/045
73/581
2009/0113735 A1 5/2009 Song et al.
(Continued)

FOREIGN PATENT DOCUMENTS

CN 210269169 U 4/2020
JP 5-126628 A 5/1993
(Continued)

OTHER PUBLICATIONS

High-Speed Ball Bearings Optimization Considering Operating Clearance in Cryogenic Environment K.B.Kang et al. *Korean Tribology Society 59th Autumn Conference* 2014 (2014)(2 pages in Korean, 5 pages in English) pp. 121-122.
(Continued)

*Primary Examiner* — Raul J Rios Russo
*Assistant Examiner* — Carl F. R. Tchatchouang
(74) *Attorney, Agent, or Firm* — NSIP Law

(57) ABSTRACT

The present disclosure provides an Anderon meter for cryogenic environment including a housing; a control arm installed on an inner circumference of the housing rotatably relative to the housing, and including a pressing portion; and a clamp including a contact portion on a side and an assembly portion on an opposite side, wherein the contact portion is in contact with the pressing portion so that the contact portion is pressed by the pressing portion, and the assembly portion is coupled to an inner circumference of the bearing by interference fit, wherein the pressing portion presses the contact portion by the control of an amount of relative rotation of the control arm and the assembly portion is coupled to the inner circumference of the bearing by interference fit to determine friction characteristics between the inner race of the bearing and the assembly portion.

9 Claims, 9 Drawing Sheets

(56) References Cited

U.S. PATENT DOCUMENTS

2017/0002819 A1* 1/2017 Wahl .................. F04D 7/00
2021/0116316 A1   4/2021 Schricker et al.
2021/0278337 A1   9/2021 Ren et al.

FOREIGN PATENT DOCUMENTS

| JP | 2006292029 A | * | 10/2006 |
| JP | 2016-121956 A | | 7/2016 |
| JP | 2016-161404 A | | 9/2016 |
| KR | 10-2003-0013583 A | | 2/2003 |
| KR | 10-2007-0114499 A | | 12/2007 |
| KR | 10-0820642 B1 | | 4/2008 |
| KR | 10-2012-0111554 A | | 10/2012 |
| KR | 10-1583032 B1 | | 1/2016 |
| KR | 10-2019-0102975 A | | 9/2019 |
| KR | 10-2019-0103010 A | | 9/2019 |
| WO | WO 2020/088431 A1 | | 5/2020 |

OTHER PUBLICATIONS

Gould, S. G., and E. W. Roberts. "The in-vacuo torque performance of dry-lubricated ball bearings at cryogenic temperatures." *NASA, Marshall Space Flight Center, The 23rd Aerospace Mechanisms Symposium.* (Mar. 1, 1989).

Lee, Sangjin, et al. "Development of Contact Pressure Analysis Model of Automobile Wiper Blades." *Transactions of the Korean Society of Automotive Engineers* 23.3 (2015): pp. 292-298.

* cited by examiner

ANDERON METER FOR CRYOGENIC ENVIRONMENT AND MEASURING METHOD FOR BEARING FRICTION TORQUE USING THE SAME

DESCRIPTION ABOUT NATIONAL RESEARCH AND DEVELOPMENT SUPPORT

This study was supported by the development of cryogenic ball bearing and terminal header technology for LNG pump of Ministry of Trade and Industry, Republic of Korea (Projects No. 1415173290) under the superintendence of Korea Evaluation Institute of Industrial Technology and smart ball bearing technology capable of machine vision-based integrated condition diagnosis of Ministry of Science and ICT, Republic of Korea (Projects No. 1711132051) under the superintendence of National Research Foundation of Korea.

CROSS-REFERENCE TO RELATED APPLICATION

This application claims priority to Korean Patent Application No. 10-2021-0100735, filed on Jul. 30, 2021, and all the benefits accruing therefrom under 35 U.S.C. § 119, the contents of which in its entirety are herein incorporated by reference.

BACKGROUND

1. Field

The present disclosure relates to an Anderon meter for cryogenic environment and a measuring method using the same, and more particularly, to an Anderon meter for cryogenic environment that measures the bearing friction torque in cryogenic fluid environments for optimal design validation of cryogenic bearings and a method for measuring the bearing friction torque using the same.

2. Description of the Related Art

Due to 2020 International Maritime Organization (IMO) regulations, with increasing liquefied natural gas (LNG) demand and trading volume in the global market, the related LNG bunkering and infrastructure market is also growing rapidly. Accordingly, there is a need for optimal design and validation technology of ball bearings in cryogenic environment.

To ensure reliability and durability of pumps, one of the essential components of LNG supply systems, it is necessary to ensure durability and reliability of cryogenic ball bearings, and with the growing LNG related market, it is expected that the related market of the essential components of cryogenic environment, in particular, bearings also will grow together.

Testers for assessing the performance of various types of bearings have been designed and developed to meet the operational requirements of target devices. However, since non-standard bearings for extreme environment have limitations on measurement and device fabrication, there is a need for equipment for test and evaluation in cryogenic environment.

In particular, cryogenic equipment used to receive data and operate sensors is priced high or customized for special environment, which makes it very difficult to access the device fabrication.

One of the existing technologies discloses a device for measuring the clearance of a bearing and separating the bearing, and the device accurately measures and adjusts the amount of bearing clearance, and can efficiently perform the bearing replacement task and the clearance measurement and bearing separation task. This device is designed to measure the clearance of standard bearings used at room temperature, and since the bearing internal clearance is measured under a unidirectional load, the measurement precision may change depending on the measurement method and the measurement environment.

Additionally, one of the existing technologies discloses a unit for measuring the friction torque under load and a tester for a rotating device equipped with the measurement unit. The device is a unit for measuring the friction torque in an environment in which the load of the rotating device is applied, and a shaft including a bearing is coupled to a torque sensor unit through coupling to measure the friction torque. This device is difficult to measure the friction torque of the bearing, and due to the configuration of the rotating device, not only the friction torque of a test bearing but also the friction torque of a support bearing is measured, and it is only possible to measure standard bearings and bearings of standard dimensions in room temperature environment.

Additionally, one of the existing technologies discloses a bearing tester for determining the friction characteristics of an automobile bearing in low temperature environment, and the tester applies load through a hydraulic load system and measures the bearing torque in low temperature environment through a cooling system. The presented low temperature bearing tester can only create an environment up to normally low temperature of −50° C. and fails to determine bearing behavior in cryogenic environment, and in particular, since a torque meter is connected after coupling at the rear end of a motor, it is difficult to determine only the friction torque of the bearing.

Meanwhile, since the existing bearing friction torque devices require connections of a support bearing, a test bearing, a bearing shaft, a torque meter and a motor, not only connection of a target bearing to measure but also connection of the entire system is required, which places limitations on measuring the torque.

Accordingly, to validate the optimal design of bearings taking into account thermal deformation in cryogenic environment, there is a need for development for a device for validating the optimal design and assembly suitability by measuring the friction torque through no-load operation in a cryogenic chamber and development of a method for measuring the bearing friction torque using the same.

RELATED LITERATURES

Patent Literature (Patent Literature 0001) Korean Patent Publication No. 10-2003-0013583 (2003.02.15)

SUMMARY

The present disclosure is designed to solve the above-described problem, and therefore the present disclosure is directed to providing an Anderon meter for cryogenic environment capable of validating the optimal design and assembly suitability by measuring the friction torque through no-load operation in a cryogenic chamber to validate the optimal design of bearings taking into account thermal deformation in cryogenic environment and a method for measuring the bearing friction torque using the same.

To solve the above-described technical problem, an Anderon meter for cryogenic environment according to the present disclosure includes a housing; a control arm installed on an inner circumference of the housing rotatably relative to the housing, and including a pressing portion; and a clamp including a contact portion on one side and an assembly portion on another side, wherein the contact portion is in contact with the pressing portion so that the contact portion is pressed by the pressing portion, and the assembly portion is coupled to an inner circumference of the bearing by interference fit, wherein the pressing portion presses the contact portion by the control of an amount of relative rotation of the control arm and the assembly portion is coupled to the inner circumference of the bearing by interference fit to determine friction characteristics between the inner race of the bearing and the assembly portion.

According to an embodiment related to the present disclosure, the control arm is installed in the housing by screw coupling.

The pressing portion may be inclined in a direction in which a rotation axis of the housing is extended, and the contact portion may be inclined with its inclination and an inclination of the pressing portion facing each other.

Additionally, the assembly portion may be in a shape of "=" to receive an inner circumferential surface of the bearing and an upper surface and a lower surface connected to the inner circumferential surface.

The number of clamps may be plural, and the plurality of clamps may be spaced apart from each other in a circumferential direction of the control arm.

According to another embodiment related to the present disclosure, the Anderon meter for cryogenic environment according to the present disclosure may further include a servomotor having a rotation axis coupled to the control arm, wherein the servomotor operates by an input voltage value to generate a rotational force, and causes the control arm to rotate by the generated rotational force.

To solve the other technical problem, a method for measuring bearing friction torque using an Anderon meter for cryogenic environment according to the present disclosure is a method for measuring bearing friction torque using the above-described Anderon meter for cryogenic environment, including measuring a friction torque occurring in the bearing by calculating a working load of the servomotor using an output current value generated through voltage control of the servomotor.

The present disclosure measures the bearing friction torque without interference of any other element using bearing assembly methods by interference fit in the same load condition without a cryogenic fluid supply chamber and heating of the bearing.

DETAILED DESCRIPTION

Hereinafter, the disclosed embodiments will be described in detail with reference to the accompanying drawings, and identical or similar elements are given identical or similar reference signs and redundant descriptions are omitted. As used herein, the suffix "portion" in the elements is only given or used to ease the drafting of the specification, and does not have any meaning or role for distinguishing one from another itself. Additionally, in describing the embodiments disclosed herein, when a certain detailed description of relevant known technology is determined to render the subject matter of the disclosed embodiments ambiguous, the detailed description is omitted. Additionally, the accompanying drawings are provided for an easy understanding of the disclosed embodiments, and the technical spirit disclosed herein is not limited by the accompanying drawings, and it should be understood that the present disclosure covers all modifications, equivalents or alternatives within the spirit and technical scope of the present disclosure.

The terms "first", "second", and the like may be used to describe various elements, but the elements are not limited by the terms. These terms are used to distinguish one element from another.

It will be understood that when an element is referred to as being "connected to" another element, it can be directly connected to the other element or intervening elements may be present.

As used herein, the singular forms include the plural forms as well, unless the context clearly indicates otherwise.

It should be understood that the term "comprises" or "includes" when used in this specification, specifies the presence of stated features, integers, steps, operations, elements, components or groups thereof, but does not preclude the presence or addition of one or more other features, integers, steps, operations, elements, components, or groups thereof.

Figure 1A:
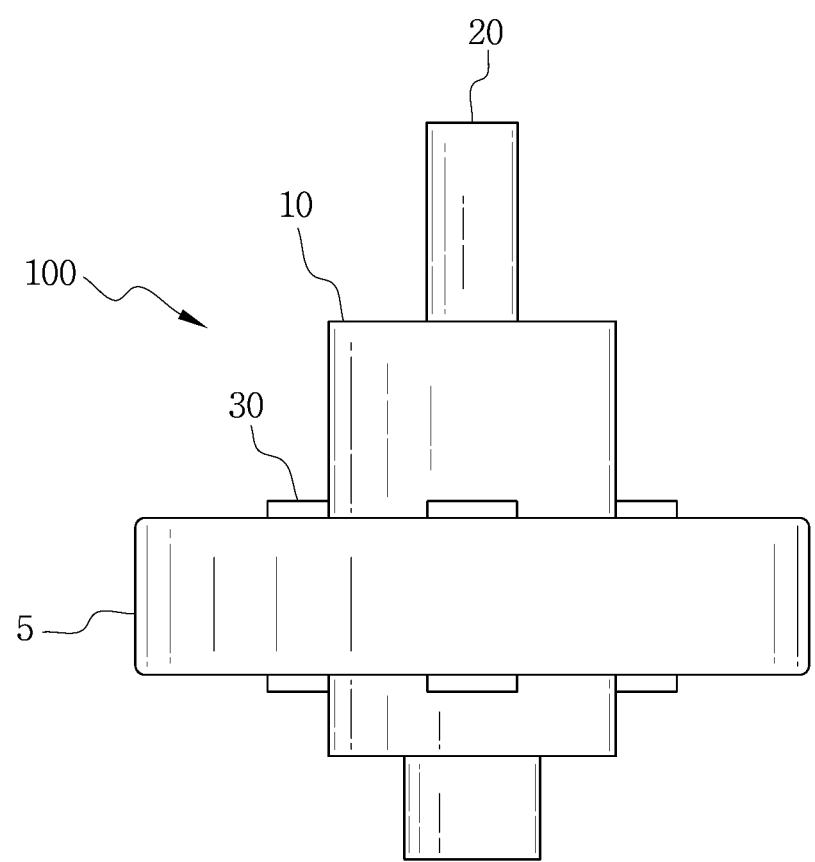
FIG. 1A is a front view of an Anderon meter for cryogenic environment according to an embodiment of the present disclosure when viewed from a side.
Figure 1B:
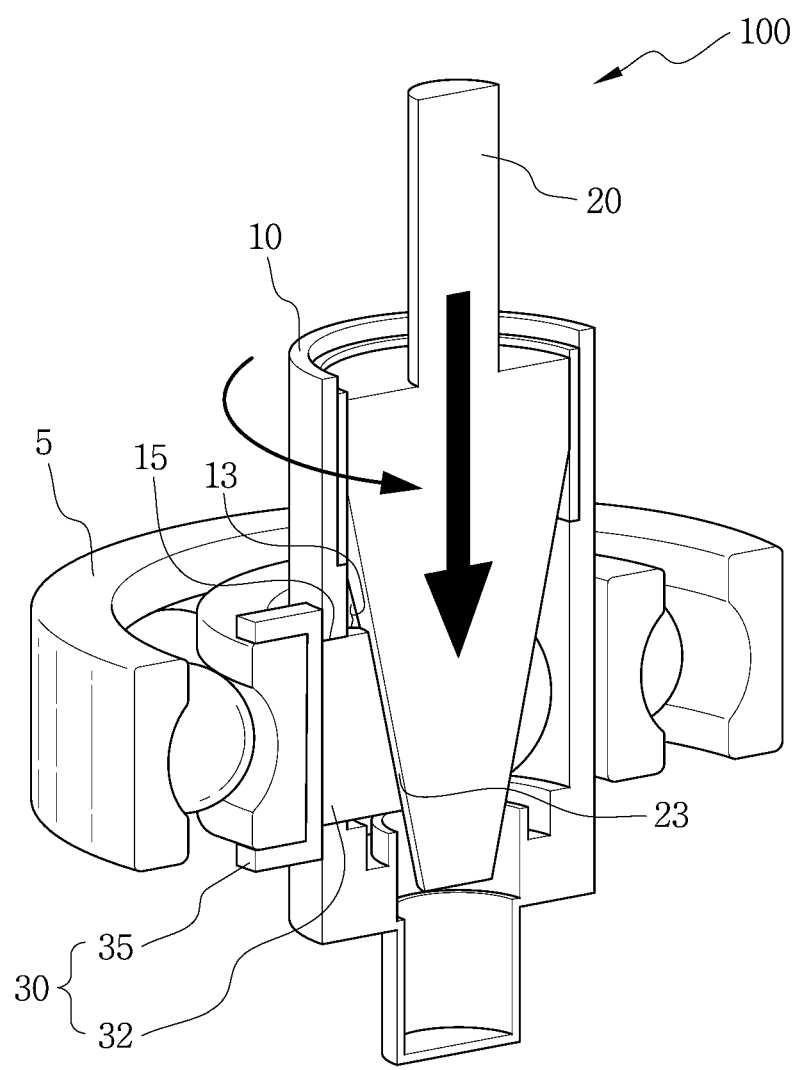
FIG. 1B is a cutoff perspective view of FIG. 1A.

FIG. 1A is a front view of an Anderon meter 100 for cryogenic environment according to an embodiment of the present disclosure when viewed from a side, FIG. 1B is a cutoff perspective view of FIG. 1A, and FIG. 10 is a top view of FIG. 1A.

Hereinafter, referring to FIGS. 1A to 10, the Anderon meter 100 for cryogenic environment according to an embodiment of the present disclosure will be described.

In cryogenic environment, thermal deformation occurs due to the material properties for each bearing element, and for stable operation, the present disclosure validates the optimal design of a bearing.

As shown in FIG. 1B, the bearing 5 described herein may be a ball bearing including balls, an inner race and an outer race.

The Anderon meter 100 for cryogenic environment according to the present disclosure includes a housing 10, a control arm 20 and a clamp 30. The housing 10 may be in a cylindrical shape as shown in FIG. 1B.

The housing 10 may include a receiving portion 13 inside in which the control arm 20 as described below can be received. Additionally, the clamp 30 as described below may be installed in the housing 10.

The control arm 20 is installed on the inner circumference of the housing 10 rotatably relative to the housing 10, and includes a pressing portion 23.

The control arm 20 may be installed in the housing 10 by screw coupling.

When the control arm 20 is installed in the housing 10 by screw coupling, although not explicitly shown in the drawings, each of the outer circumference of the control arm 20 and the inner circumference of the housing 10 may have screw threads that are matched up with each other.

Additionally, the pressing portion 23 may be inclined in a direction in which a rotation axis of the control arm 20 is extended.

Referring to FIG. 1B, an example is shown in which the control arm 20 is installed on the inner circumference of the housing 10, and the pressing portion 23 of the control arm 20 is inclined such that it becomes narrower as it goes downwards. Additionally, when the control arm 20 of FIG. 1B rotates along the arrow of the circumferential direction, the control arm 20 moves down relative to the housing 10 and presses the clamp 30 as described below.

The clamp 30 is installed in the housing 10, and is clamping-coupled to the inner circumference of the bearing 5 when pressed by the pressing portion 23 of the control arm 20. To this end, the clamp 30 may be installed through a side of the housing 10.

The clamp 30 includes a contact portion 32 and an assembly portion 35.

The contact portion 32 is provided on a side of the clamp 30, and is positioned in contact with the pressing portion 23 so that it is pressed by the pressing portion 23. The contact portion 32 may be inclined with its inclination and the inclination of the pressing portion 23 facing each other. FIG. 1B shows an example in which the contact portion 32 is inclined with a narrow top and a wide bottom and is positioned in contact with the pressing portion 23.

Accordingly, as the control arm 20 moves down with rotation, the contact portion 32 is pressed by the pressing portion 23 and moves in a direction that faces away from the rotation axis of the control arm 20, i.e., in a direction toward the inner circumference of the bearing 5.

To this end, a perforation portion 15 may be provided at the side of the housing 10 to receive the contact portion 32 moveably in the radial direction, and the perforation portion 15 may be a slot or a long hole.

The assembly portion 35 is provided on an opposite side of the clamp 30, and is coupled to the inner circumference of the bearing 5 by interference fit. The assembly portion 35 may be in the shape of "⊏" to receive the inner circumferential surface of the inner race of the bearing 5 and the upper surface and the lower surface connected to the inner circumferential surface.

Referring to FIG. 1B, an example is shown in which the contact portion 32 is provided on the relatively inner side of the clamp 30 and inclined in the vertical direction with its inclination and the inclination of the pressing portion 23 facing each other, and the assembly portion 35 is provided on the relatively outer side of the clamp 30 in the shape of ⊏ and coupled by interference fit to receive the inner circumferential surface and the upper and lower surfaces of the inner race of the bearing 5.

Meanwhile, the number of clamps 30 may be plural, and the plurality of clamps 30 may be spaced apart from each other in the circumferential direction of the control arm 20.

Figure 1C:
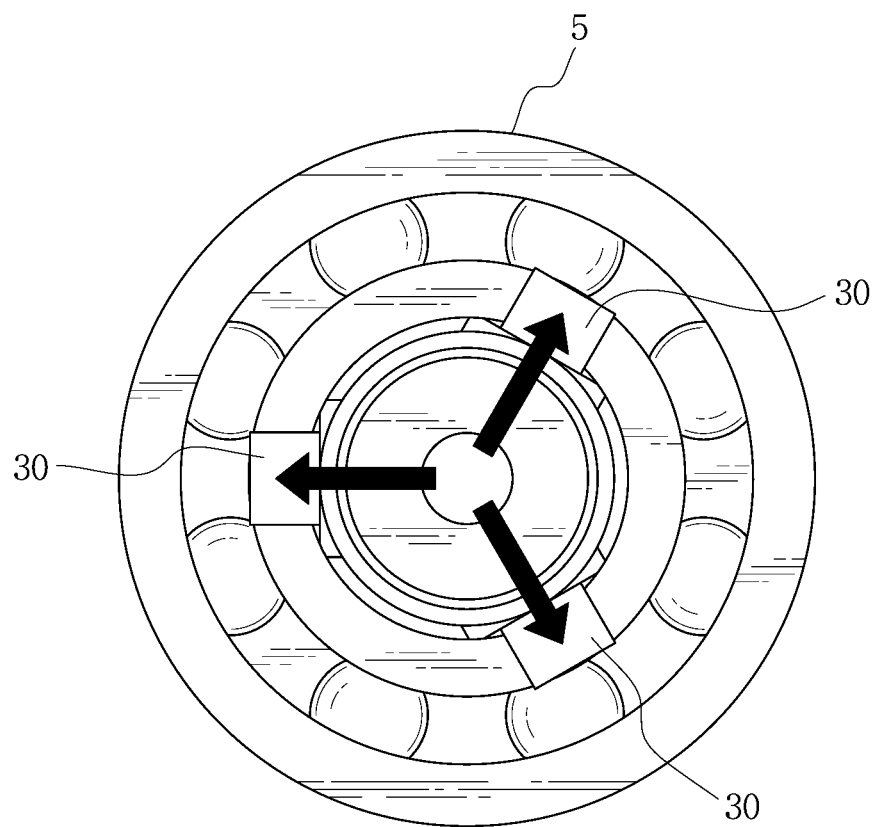
FIG. 1C is a top view of FIG. 1A.

FIG. 1C shows an example in which three clamps 30 are arranged in the circumferential direction of the control arm 20, and the three clamps 30 are arranged at an angle of 120° and clamped to the inner race of the bearing 5 in the arrow direction.

The Anderon meter 100 for cryogenic environment according to the present disclosure is configured such that the pressing portion 23 presses the contact portion 32 by the control of the amount of relative rotation of the control arm 20 and the assembly portion 35 is coupled to the inner circumference of the bearing 5 by interference fit, to determine the friction characteristics between the inner race of the bearing 5 and the assembly portion 35.

Due to the characteristics of the bearing that is coupled to the rotation axis by interference fit, shafts of different sizes are necessary to measure bearings of different sizes, and to solve this problem, by this structure, the present disclosure can directly couple the motor to the inner races of bearings of various sizes using a chuck.

Figure 2A:
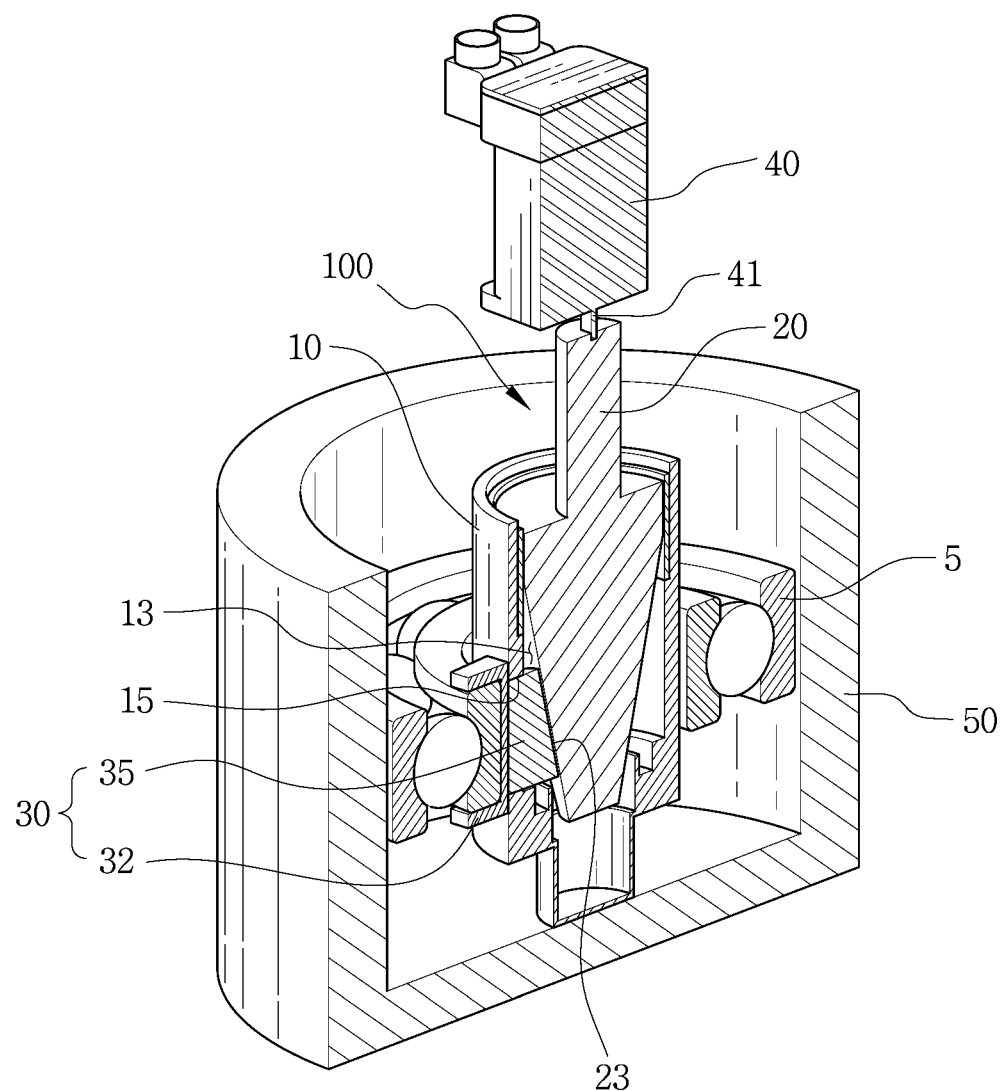
FIG. 2A is a cutoff perspective view showing an Anderon meter for cryogenic environment according to another embodiment of the present disclosure.
Figure 2B:
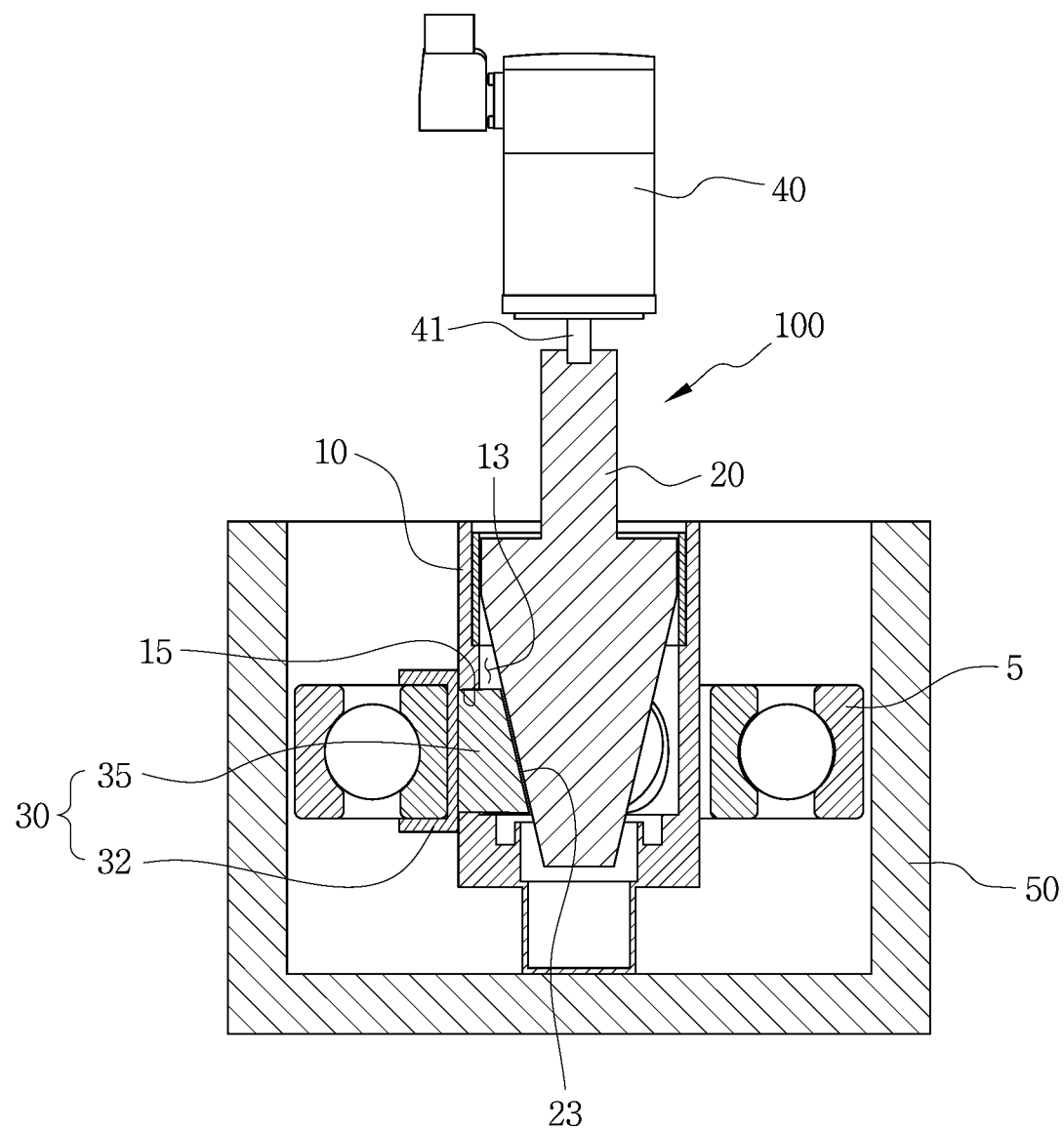
FIG. 2B is a cross-sectional view of FIG. 2A when viewed from a side.

FIG. 2A is a cutoff perspective view showing the Anderon meter 100 for cryogenic environment according to another embodiment of the present disclosure, and FIG. 2B is a cross-sectional view of FIG. 2A when viewed from a side.

Hereinafter, the Anderon meter 100 for cryogenic environment according to another embodiment of the present disclosure further including a servomotor 40 will be described with reference to FIGS. 2A and 2B.

The Anderon meter 100 for cryogenic environment according to the present disclosure may further include the servomotor 40.

The servomotor 40 includes a rotation axis 41 coupled to the control arm 20, and the servomotor 40 operates by an input voltage value to generate a rotational force and causes the control arm 20 to rotate by the generated rotational force.

The servomotor 40 generates an output current, and the bearing friction torque is measured by the output current.

Additionally, the Anderon meter 100 for cryogenic environment according to the present disclosure may further include a casing 50 to receive the housing 10, the control arm 20 and the clamp 30.

The casing 50 may be, for example, a nitrogen storage flask for storing nitrogen ($LN_2$).

By the casing 50, the housing 10, the control arm 20 and the clamp 30 received inside may be placed in a nitrogen environment.

Figure 3A:
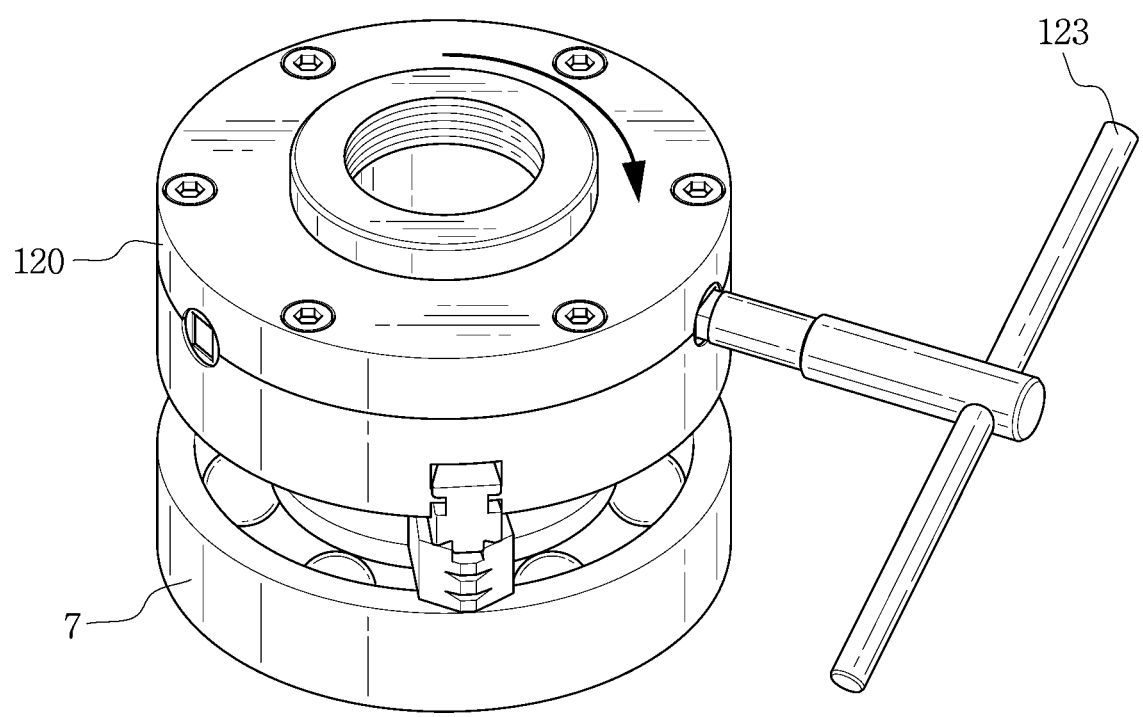
FIG. 3A is a perspective view showing an example of a jaw installed on a test bearing.
Figure 3B:
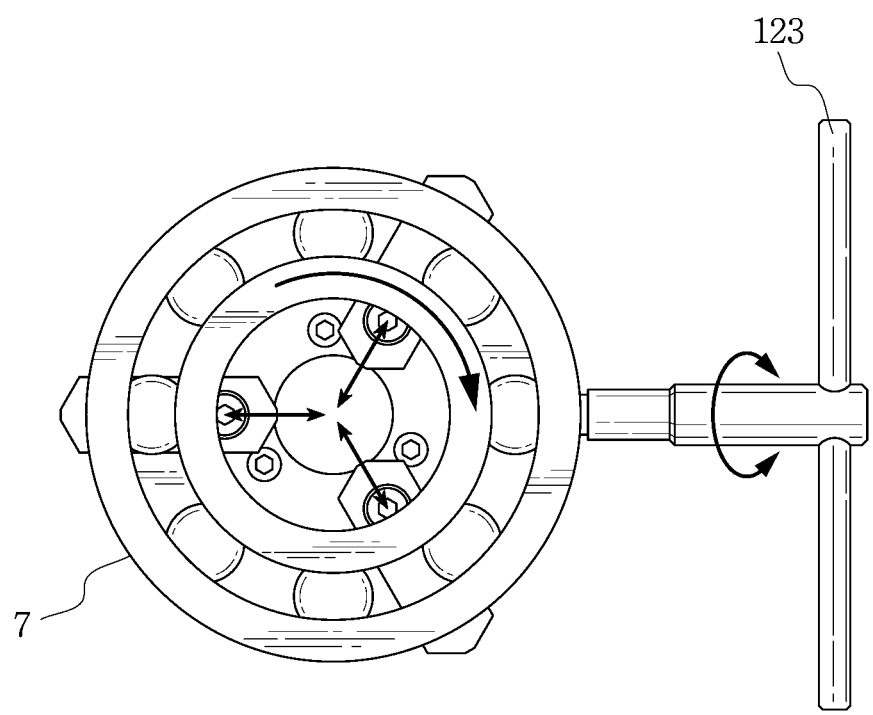
FIG. 3B is a bottom view of FIG. 3A when viewed from the bottom.

FIG. 3A is a perspective view showing an example of a jaw 120 installed on a test bearing 7, and FIG. 3B is a bottom view of FIG. 3A when viewed from the bottom.

Referring to FIGS. 3A and 3B, the jaw 120 installed on the inner race of the test bearing 7 is shown. When a user rotates a handle 123, the jaw 120 may be assembled to the inner race of the test bearing 7 by interference fit. Hereinafter, a method for measuring the bearing friction torque using the output current of the servomotor 40 will be described.

The method for measuring the bearing friction torque includes measuring the friction torque occurring in the bearing by calculating the working load of the servomotor 40 using the output current value generated through the voltage control of the servomotor 40.

Figure 4:
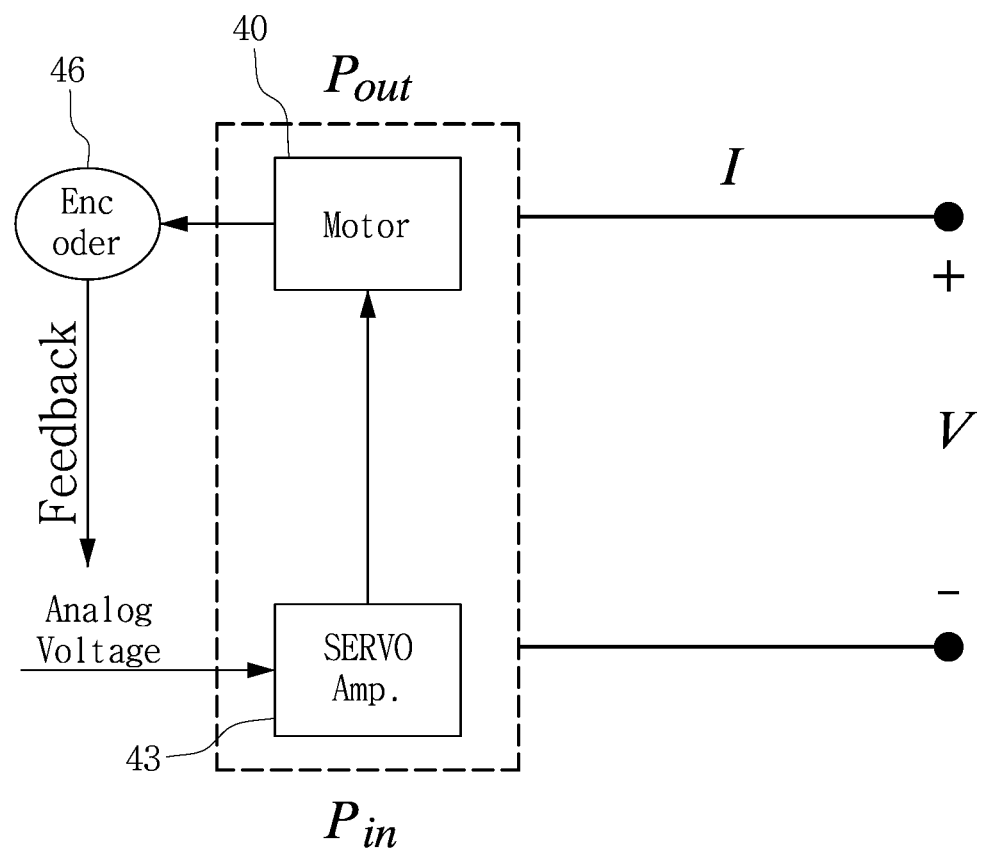
FIG. 4 is a conceptual diagram showing a method for measuring the bearing friction torque using an Anderon meter for cryogenic environment according to the present disclosure.

Referring to FIG. 4, an example is shown in which an analog voltage value is inputted through a servo amplifier 43 and then fed back through an encoder 46 after it is used to control the motor 40.

More specifically, the method for measuring the bearing friction torque may be represented by the following [Equation 1] to [Equation 6].

$$P_{in}=I\times V \quad \text{[Equation 1]}$$

In [Equation 1], $P_{in}$ is the power value inputted to the servomotor, I is the current value outputted from the servomotor, and V is the root mean square (RMS) voltage value of the servomotor.

$$P_{out}=\tau\times\omega \quad \text{[Equation 2]}$$

In [Equation 2], $P_{out}$ is the power value outputted from the servomotor, $\tau$ is the calculated torque value of the servomotor, and w is the rotational speed of the servomotor.

$$E=P_{out}/P_{in} \quad \text{[Equation 3]}$$

In [Equation 3], E is the efficiency of the servomotor, $P_{out}$ is the power value outputted from the servomotor, and $P_{in}$ is the power value inputted to the servomotor.

$$P_{out}=P_{in}\times E \quad \text{[Equation 4]}$$

In [Equation 4], $P_{out}$ is the power value outputted from the servomotor, $P_{in}$ is the power value inputted to the servomotor, and E is the efficiency of the servomotor.

$$\tau\times\omega=I\times V\times E \quad \text{[Equation 5]}$$

In [Equation 5], $\tau$ is the calculated torque value of the servomotor, w is the rotational speed of the servomotor 40, I is the current value outputted from the servomotor, V is the RMS voltage value of the servomotor 40, and E is the efficiency of the servomotor.

$$\tau_b=\tau-\tau_0 \quad \text{[Equation 6]}$$

In [Equation 6], $\tau_b$ is the target friction torque value of the bearing, $\tau$ is the calculated torque value of the servomotor, and $\tau_0$ is the friction torque value of the servomotor under no load.

Figure 5:
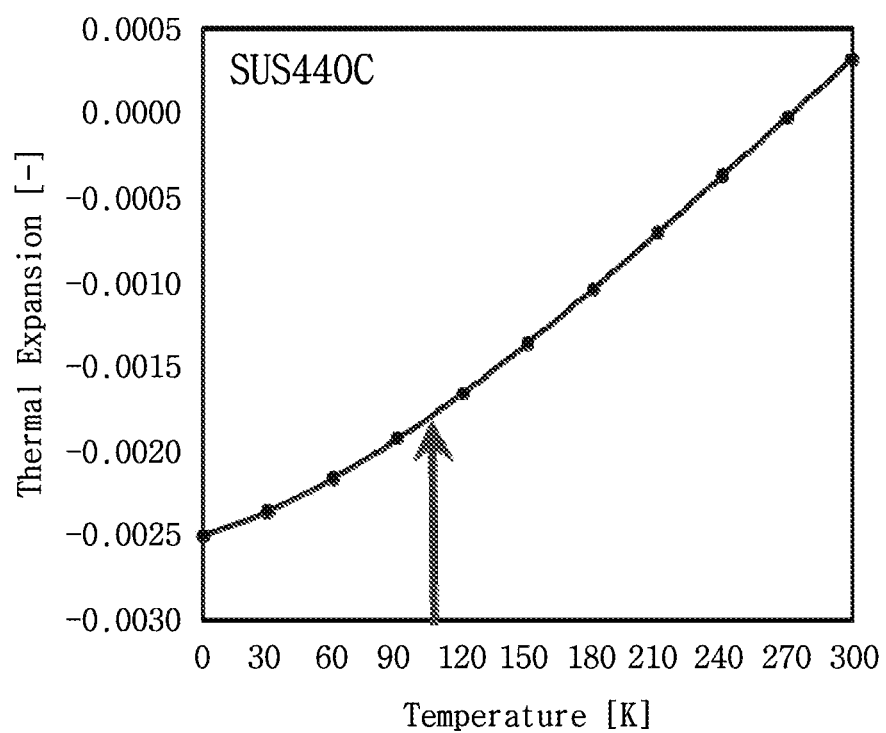
FIG. 5 is a graph showing the experimental results for thermal expansion coefficient with temperature for SUS440C.

FIG. 5 is a graph showing the experimental results for thermal expansion coefficient with temperature for SUS440C.

The amount of deformation by heat of 110K is about Δ5.83 μm on the basis of 1 inch diameter steel balls of ball bearings.

In the case of cryogenic bearings which are non-standard bearings, materials are different for each bearing element, and the extent of thermal expansion is different for each material. In particular, the extent of thermal expansion directly affects the bearing internal clearance and is directly related to the bearing performance.

The Anderon meter 100 for cryogenic environment according to the present disclosure and the method for measuring the bearing friction torque using the same may quantitatively measure the variation of bearing internal clearance in cryogenic environment.

Additionally, bearings are designed and manufactured taking into account thermal deformation in cryogenic environment, but the existing domestic testers can only conduct bearing life test and evaluation through bearing performance test and evaluation.

Accordingly, the Anderon meter 100 for cryogenic environment according to the present disclosure and the method for measuring the bearing friction torque using the same can validate the optimal design of cryogenic bearings by evaluating the friction torque by the bearing internal clearance under no load.

The Anderon meter 100 for cryogenic environment and the method for measuring the bearing friction torque using the same as described hereinabove are not limited to the configuration and method of the embodiments described above, and some or all the embodiments may be selectively combined to make various modifications.

It is obvious to those skilled in the art that the present disclosure may be embodied in other particular forms without departing from the spirit and essential features of the present disclosure. Therefore, the above detailed description should not be interpreted as being limiting in all aspects and should be considered as being exemplary. The scope of the present disclosure should be determined by the reasonable interpretation of the appended claims, and the scope of the present disclosure covers all modifications within the equivalent scope of the present disclosure.

[Detailed Description of Main Elements]

| | | |
|---|---|---|
| 5: Bearing | | |
| 100: Anderon meter for cryogenic environment | | |
| 10: Housing | 13: Receiving portion | 15: Perforation portion |
| 20: Control arm | 23: Pressing portion | |
| 30: Clamp | 32: Contact portion | 35: Assembly portion |
| 40: Servomotor | 41: Rotation axis | |
| 43: Servo amplifier | 46: Encoder | |
| 50: Casing | | |
| 120: Jaw | 123: Handle | 7: Test bearing |

What is claimed is:

1. An Anderon meter for cryogenic environment, comprising:
   a housing;
   a control arm installed on an inner circumference of the housing rotatably relative to the housing, and including a pressing portion; and
   a clamp including a contact portion on one side and an assembly portion on another side, wherein the contact portion is in contact with the pressing portion so that the contact portion is pressed by the pressing portion, and the assembly portion is coupled to an inner circumference of a bearing by interference fit,
   wherein the pressing portion presses the contact portion by the control of an amount of relative rotation of the control arm and the assembly portion is coupled to the inner circumference of the bearing by interference fit to determine friction characteristics between an inner race of the bearing and the assembly portion, and
   wherein the pressing portion is inclined in a direction in which a rotation axis of the housing is extended, and the contact portion is inclined with its inclination and an inclination of the pressing portion facing each other.

2. The Anderon meter for cryogenic environment according to claim 1, wherein the control arm is installed in the housing by screw coupling.

3. The Anderon meter for cryogenic environment according to claim 1, wherein the assembly portion is in a shape of ⊏ to receive an inner circumferential surface of the bearing and an upper surface and a lower surface connected to the inner circumferential surface.

4. The Anderon meter for cryogenic environment according to claim 3, wherein a number of clamps is plural, and the plurality of clamps is spaced apart from each other in a circumferential direction of the control arm.

5. The Anderon meter for cryogenic environment according to claim 1, further comprising:
   a servomotor having a rotation axis coupled to the control arm, wherein the servomotor operates by an input voltage value to generate a rotational force, and causes the control arm to rotate by the generated rotational force.

6. A method for measuring bearing friction torque using the Anderon meter for cryogenic environment defined in claim 5, comprising:

measuring a friction torque occurring in the bearing by calculating a working load of the servomotor using an output current value generated through voltage control of the servomotor.

7. An Anderon meter for cryogenic environment, comprising:

a housing;

a control arm installed on an inner circumference of the housing rotatably relative to the housing, and including a pressing portion;

a clamp including a contact portion on one side and an assembly portion on another side, wherein the contact portion is in contact with the pressing portion so that the contact portion is pressed by the pressing portion, and the assembly portion is coupled to an inner circumference of a bearing by interference fit; and a servomotor having a rotation axis coupled to the control arm, wherein the servomotor operates by an input voltage value to generate a rotational force, and causes the control arm to rotate by the generated rotational force, wherein the pressing portion presses the contact portion by the control of an amount of relative rotation of the control arm and the assembly portion is coupled to the inner circumference of the bearing by interference fit to determine friction characteristics between an inner race of the bearing and the assembly portion.

8. The Anderon meter for cryogenic environment according to claim 7, wherein the control arm is installed in the housing by screw coupling.

9. A method for measuring bearing friction torque using the Anderon meter for cryogenic environment defined in claim 7, comprising:

measuring a friction torque occurring in the bearing by calculating a working load of the servomotor using an output current value generated through voltage control of the servomotor.

* * * * *